(12) United States Patent
Pott et al.

(10) Patent No.: US 7,316,108 B2
(45) Date of Patent: Jan. 8, 2008

(54) HYBRID VEHICLE

(75) Inventors: Ekkehard Pott, Gifhorn (DE); Michael Zillmer, Sickte (DE); Matthias Holz, Lehre (DE); Marc Hladun, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 205 days.

(21) Appl. No.: 11/186,557

(22) Filed: Jul. 21, 2005

(65) Prior Publication Data

US 2006/0016175 A1    Jan. 26, 2006

(30) Foreign Application Priority Data

Jul. 21, 2004    (DE) .................... 10 2004 035 341

(51) Int. Cl.
*F01N 3/10* (2006.01)
*F01N 3/00* (2006.01)

(52) U.S. Cl. ........................... 60/299; 60/286
(58) Field of Classification Search ............... 60/299
See application file for complete search history.

(56) References Cited

U.S. PATENT DOCUMENTS 5,842,534 A * 12/1998 Frank ................ 180/65.2
6,040,634 A * 3/2000 Larguier ............. 290/45
6,266,956 B1 * 7/2001 Suzuki et al. ......... 60/278
6,321,530 B1 * 11/2001 Hoshi et al. .......... 60/274
6,657,315 B1 12/2003 Peters et al.
2005/0262830 A1 * 12/2005 Pott et al. ............ 60/282

FOREIGN PATENT DOCUMENTS

EP    1 182 074 A2    2/2002

* cited by examiner

*Primary Examiner*—Thomas Denion
*Assistant Examiner*—Loren Edwards (57) ABSTRACT

A hybrid vehicle includes an internal combustion engine with a cylinder head, at least one outlet for exhaust gas which is formed in the cylinder head, a device for directly injecting fuel into a combustion chamber, a spark-ignition device for igniting the directly injected fuel in the combustion chamber, at least one electric drive and an exhaust gas control system which is connected downstream of the combustion chamber and has at least one catalytic converter in at least one exhaust tract. The catalytic converter which is closest to the engine in each exhaust tract is positioned in the exhaust gas control system in such a way that a length of an exhaust pipe between the outlet for exhaust gas in the cylinder head and an end face of this catalytic converter that faces the cylinder head is at least 500 mm.

21 Claims, 5 Drawing Sheets

HYBRID VEHICLE

BACKGROUND OF THE INVENTION

FIELD OF THE INVENTION

The invention relates to a hybrid vehicle having an internal combustion engine, in particular a spark-ignition engine, in particular for a motor vehicle, having a cylinder head, at least one outlet for exhaust gas which is formed in the cylinder head, a device for directly injecting fuel into a combustion chamber, a spark-ignition device for igniting the directly injected fuel in the combustion chamber, at least one electric drive and an exhaust gas control system which is connected downstream of the combustion chamber and has at least one catalytic converter in at least one exhaust tract.

In hybrid vehicles, two drive units, which provide power for the vehicle drive in respective different ways, are combined with one another. Parallel hybrid concepts provide the possibility of using in the various operating states of a motor vehicle the drive source which respectively has the better efficiency in the given rotational speed/load range. The properties of an internal combustion engine and of an electric drive (for example starter generator) complement one another particularly well, for which reason hybrid vehicles are being mainly equipped with such a combination nowadays. In this context the electric drive can be connected to the engine crankshaft in different ways. For example it can be connected to the crankshaft of the engine via a clutch or directly or be coupled via a belt drive or a transmission.

Operation with the electric drive may take place, for example, in ranges with only low load requirements, in which an internal combustion engine has only low efficiency levels while increased load requirements are used to reload the electric energy storage (from which the electric drive is fed in the motor operating mode) through the use of the internal combustion engine with a then relatively good level of efficiency by the additional generator operating mode of the electric drive. Furthermore, the torque output of the internal combustion engine and electric drive can also take place in parallel in order, for example, to increase the maximum torque.

Furthermore, a directly coupled, high-power electric drive has the advantage of an infinitely variable adjustment of the torque (both positive and negative) over the entire operating range with very high dynamics, resulting in further advantages in combination with an internal combustion engine. For example, the internal combustion engine can thus also be started in a very short time and with a very high level of comfort, which in addition to the cold start also signifies in particular advantages for a start/stop operating mode. In addition, coupled electric drives also provide the possibility of recovering braking energy in electric energy storages such as batteries or capacitor storages.

In order to obtain the highest possible overall efficiency level for the hybrid vehicle, it is appropriate to use an internal combustion engine which is as low in consumption as possible. In addition to diesel engines, basically direct injection spark-ignition engines are possible for this, the engines already reaching better efficiency levels in the homogenous operating mode than conventional aspirating spark-ignition engines due to the higher compression and the higher exhaust gas recirculation compatibility. If the direct injection spark-ignition engine is embodied so as to be capable of lean operation, the highest possible consumption advantage can be achieved by using the stratified operating mode and the homogenous lean operating mode.

In direct injection spark-ignition engines, less time is available for the internal mixture formation due to the direct application of fuel, which leads to a lower mixture formation quality in comparison with external mixture formation, even in the homogenous operating mode. In addition, the direct injection of the fuel can lead to increased wetting of the wall of the combustion chamber, as a result of which higher Hydrocarbon (HC) raw emissions may occur in particular after a cold start. For this reason, the start emissions are also increased in comparison with conventional spark-ignition engines. In the stratified lean operating mode, the nonhomogenous mixture formation typically also results in increased Hydrocarbon (HC) raw emissions.

Due to these relationships, a more complex exhaust gas post-treatment device is necessary for direct injection spark-ignition engines so that conventional catalytic converter systems for these engines always have at least one catalytic converter close to the engine and frequently one additional underfloor catalytic converter per exhaust tract, in particular in lean operation concepts. If the direct injection spark-ignition engine is operated in a lean operating mode, the excess air operating mode requires both the use of a three-way precatalytic converter and three-way underfloor catalytic converter as well as the additional use of an exhaust gas control device for nitrogen oxides ($NO_x$), with the so-called $DeNO_x$ function being performed by an $NO_x$ storage catalytic converter in most series productions, the storage catalytic converter being integrated into the underfloor catalytic converter (main catalytic converter)—as a rule the coating of the underfloor catalytic converter has both the three-way properties and the function of storing and regenerating nitrogen oxides.

Due to the additional use of an electric drive, power electronics, energy storage, hybrid controller etc, the hybrid technology is associated with increased costs. A direct injection spark-ignition engine also gives rise to increased costs in comparison with a conventional spark-ignition engine due to the use of a high-pressure injection system, possibly a controllable charge movement valve and further changes. In particular, the more complex exhaust gas post-treatment device composed of at least one catalytic converter close to the engine and frequently one additional underfloor catalytic converter per exhaust tract entails further additional costs, for which reason no series hybrid vehicle for markets with stringent exhaust gas requirements is configured for the direct injection spark-ignition engine in order to avoid excessively increasing the overall costs of the hybrid vehicle. Such stringent exhaust gas requirements have been specified in a set of standards referred to as LEV (low emission vehicle), Euro III and in other more stringent standards.

SUMMARY OF THE INVENTION

It is accordingly an object of the invention to provide a hybrid vehicle which overcomes the above-mentioned disadvantages of the heretofore-known hybrid vehicles of this general type and which is improved in terms of cost and exhaust gas emissions.

With the foregoing and other objects in view there is provided, in accordance with the invention, a hybrid vehicle, including:

a drive system including an electric drive and an internal combustion engine;

the internal combustion engine having a combustion chamber formed therein;

the internal combustion engine including a cylinder head having an exhaust gas outlet formed therein;

the internal combustion engine including a fuel injection device for directly injecting fuel into the combustion chamber and a spark-ignition device for igniting the fuel in the combustion chamber;

an exhaust gas control system downstream of the combustion chamber;

the exhaust gas control system including an exhaust tract and a catalytic converter provided in the exhaust tract;

the catalytic converter having an end face facing the cylinder head;

the exhaust tract including an exhaust pipe between the end face of the catalytic converter and the exhaust gas outlet of the cylinder head;

the exhaust pipe having a length of at least 500 mm.

In other words, according to the invention, there is provided a hybrid vehicle having an internal combustion engine, in particular a spark-ignition engine, in particular for a motor vehicle, having a cylinder head, at least one outlet for exhaust gas which is formed in the cylinder head, a device for directly injecting fuel into a combustion chamber, a spark-ignition device for igniting the directly injected fuel in the combustion chamber, at least one electric drive and an exhaust gas control system which is connected downstream of the combustion chamber and has at least one catalytic converter in at least one exhaust tract, wherein the catalytic converter which is closest to the engine in each exhaust tract is provided in the exhaust gas control system in such a way that a length of an exhaust pipe between the outlet for exhaust gas in the cylinder head and an end face—facing the cylinder head—of this catalytic converter which is closest to the engine is at least 500 mm or more.

According to another feature of the invention, the catalytic converter is a precatalytic converter; the exhaust gas control system includes a further catalytic converter as a main catalytic converter in the exhaust tract; and the precatalytic converter is disposed closer to the internal combustion engine than the main catalytic converter.

According to yet another feature of the invention, the exhaust tract includes only one catalytic converter.

According to a further feature of the invention, the exhaust gas control system includes a further exhaust tract, each of the exhaust tract and the further exhaust tract respectively includes only one catalytic converter.

According to another feature of the invention, the drive system includes a torque control device for controlling a torque output of the internal combustion engine and of the electric drive; and the torque control device, in order to reach a given conversion threshold value of a catalytic conversion activity, determines a conversion activity value for at least one exhaust gas component in a given time interval and, if the conversion activity value is below the given conversion threshold value, the torque control device increases a torque output of the electric drive, preferably in dependence of a demand, and reduces a torque output of the internal combustion engine in comparison with an operation providing no torque from the electric drive.

According to yet another feature of the invention, the exhaust pipe between the end face of the catalytic converter and the exhaust gas outlet of the cylinder head has a length of at least 700 mm and at most a length of 900 mm, 1200 mm, 1500 mm or 2000 mm.

According to a further feature of the invention, the internal combustion engine is capable of running in a lean operation mode, and preferably in a stratified charge operation mode, in at least a given portion of a given rotational speed/mean pressure range, the given rotational speed/mean pressure range covers a rotational speed range of 1000 to 3000/min and a mean pressure range of 0 to 300 kPa (0 to 3 bar), and the given portion of the given rotational speed/mean pressure range is 60%, 75% or 90% of the given rotational speed/mean pressure range.

According to another feature of the invention, the internal combustion engine is capable of running in a lean operation mode, and preferably in a stratified charge operation mode, in at least a given portion of a given rotational speed/mean pressure range, the given rotational speed/mean pressure range covers a rotational speed range from idling rotational speed to 1500/min and a mean pressure range of 0 to 200 kPa (0 to 2 bar), and the given portion of the given rotational speed/mean pressure range is 20%, 35% or 50% of the given rotational speed/mean pressure range.

According to a further feature of the invention, the internal combustion engine is an aspirating engine.

According to another feature of the invention, the internal combustion engine includes an exhaust gas turbocharger, an electrically driven charge air compressor device and/or a mechanically driven charge air compressor device.

According to yet another feature of the invention, the catalytic converter is an $NO_x$ storage catalytic converter.

According to a further feature of the invention, the exhaust gas control system has a given proportion of a total catalytic converter volume per engine capacity, the given proportion is less than 1.3 $dm^3$ per $dm^3$ engine capacity, less than 1.1 $dm^3$ per $dm^3$ engine capacity, less than 0.9 $dm^3$ per $dm^3$ engine capacity, less than 0.7 $dm^3$ per $dm^3$ engine capacity or less than 0.5 $dm^3$ per $dm^3$ engine capacity.

According to yet a further feature of the invention, the exhaust gas control system has a given proportion of a total noble metal load for catalytic conversion per engine capacity, the given proportion is less than 3.3 g per $dm^3$ engine capacity, less than 3.0 g per $dm^3$ engine capacity, less than 2.7 g per $dm^3$ engine capacity, less than 2.4 g per $dm^3$ engine capacity or less than 2.0 g per $dm^3$ engine capacity.

According to another feature of the invention, the internal combustion engine has a rated rotational speed, a cut off speed, a rated power, and a given mean pressure present at the rated power; the internal combustion engine, when operating in a given rotational speed/load range, operates with a stoichiometric setpoint value for a fuel/air mixture in at least a portion of the given rotational speed/load range, the portion of the given rotational speed/load range is 30%, 50%, 70%, 80% or 90% of the given rotational speed/load range; and the internal combustion engine operates in the given rotational speed/load range if the internal combustion engine operates in a range between 80% of the rated rotational speed and the lesser of 120% of the rated rotational speed and the cut off speed of the internal combustion engine, and if the internal combustion engine operates with more than 80% of the given mean pressure present at the rated power.

According to another feature of the invention, an electric energy storage device is connected to the electrical drive, the electric energy storage device has a maximum voltage; and the electric drive has a maximum mechanical power output when it operates with the maximum voltage in a motor operating mode, the maximum mechanical power output is higher 2 kW, 3 kW, 4 kW, 6 kW or 9 kW per 1000 kg of unladen vehicle weight.

According to another feature of the invention, the electric drive has a maximum charge power output when operating in a generator operating mode with a maximum charge voltage, the maximum charge power output is higher than 2 kW, 3 kW, 4 kW, 6 kW or 9 kW per 1000 kg of unladen vehicle weight.

According to another feature of the invention, a torque converter, in particular a transmission, is provided downstream of the internal combustion engine; and the electric drive is a crankshaft starter generator provided between the internal combustion engine and the torque converter.

According to another feature of the invention, the electric drive is a starter generator.

The above-described configuration has the advantage that it is unexpectedly possible to comply with legal requirements for exhaust gas limiting values even with such an internal combustion engine. Previously it was in fact believed that with direct injection spark-ignition engines these limiting values could only be met with a catalytic converter which is close to the engine and which performs a sufficient conversion of pollutants during a warming up phase in which a catalytic converter in the underfloor position is still too cold, i.e. has not yet reached or exceeded its light-off temperature. The catalytic converter which is closest to the engine can also be made more cost-effective in terms of protecting components and in terms of coating.

For example, the exhaust gas control system includes at least one precatalytic converter and at least one main catalytic converter in an exhaust tract, with the precatalytic converter being the catalytic converter which is closest to the engine.

Since the exhaust gas control system only has one catalytic converter per exhaust tract it is particularly advantageously possible to greatly reduce the costs of the exhaust gas control system.

In one particularly preferred embodiment, a device for controlling the torque output of the internal combustion engine and of the electric drive is provided, through the use of which device the value of the conversion activity is determined in order to reach a predefined conversion threshold value of the conversion activity of a catalytic converter system of the exhaust gas control system for at least one exhaust gas component in a predefined time interval T_Kat and, if this value is below the abovementioned threshold value, the torque output of the electric drive is increased, preferably as a function of demand, and the torque output of the internal combustion engine is reduced in comparison with an operation of the hybrid vehicle without provision of a torque by the electric drive. By reducing the torque output of the internal combustion engine it is possible to reduce a raw emission, in particular of hydrocarbons, for the predefined time interval, while at the same time the conversion activity of the catalytic converter system is influenced favorably in order to reach the predefined conversion threshold value. This permits optimized use of the torque output of the internal combustion engine and electric drive in terms of reaching a predefined conversion threshold value.

The length of the exhaust pipe between the outlet for exhaust gas and the end face of the catalytic converter which is closest to the engine is expediently at least 700 mm to 2000 mm, in particular 900 mm, 1200 mm or 1500 mm.

In a preferred embodiment, the internal combustion engine is capable of lean operation, preferably stratified charge operation, in at least 60%, preferably at least 75% or at least 90% of the rotational speed/mean pressure range from 1000 to 3000/min and 0 to 300 kPa (0 to 3 bar).

In the rotational speed/mean pressure range, the internal combustion engine is expediently capable of lean operation, preferably stratified charge operation, in at least 20%, preferably at least 35% or at least 50% of the range covering the idling rotational speed up to 1500/min and 0 to 200 kPa (0 to 2 bar).

The internal combustion engine is expediently an aspirating engine or the internal combustion engine has an exhaust gas turbocharger and/or a charge air compressor device which is expediently driven mechanically or electrically.

The at least one catalytic converter per exhaust tract is, for example, an $NO_x$ storage catalytic converter.

The volume of all the catalytic converters is expediently less than 1.3 $dm^3$ per $dm^3$ engine capacity, less than 1.1 $dm^3$ per $dm^3$ engine capacity, less than 0.9 $dm^3$ per $dm^3$ engine capacity, less than 0.7 $dm^3$ per $dm^3$ engine capacity or less than 0.5 $dm^3$ per $dm^3$ engine capacity.

The overall noble metal load of all the catalytic converters is expediently less than 3.3 g per $dm^3$ engine capacity, less than 3.0 g per $dm^3$ engine capacity, less than 2.7 g per $dm^3$ engine capacity, less than 2.4 g per $dm^3$ engine capacity or less than 2.0 g per $dm^3$ engine capacity.

Preferably, the fuel/air mixture set-point value for the internal combustion engine is set such that in the rotational speed/load range of 80% of the rated rotational speed up to 120% of the rated rotational speed or the cut off speed of the engine, depending on which value is reached earlier, and more than 80% of the mean pressure present in the case of rated power, the fuel/air mixture set-point value for the internal combustion engine is preferably stoichiometric in more than 30%, more than 50%, more than 70%, more than 80% or more than 90% of this range.

In the motor operating mode the electric drive expediently has a maximum mechanical power output of at least 2 kW, 3 kW, 4 kW, 6 kW or 9 kW per 1000 kg unladen weight of the vehicle given maximum voltage of an electric energy storage.

In the generator operating mode the electric drive preferably has a maximum electric power output of at least 2 kW, 3 kW, 4 kW, 6 kW or 9 kW per 1000 kg unladen weight of the vehicle given maximum charge voltage of an electric energy storage.

The electric drive is, for example, arranged as a crankshaft starter generator between the internal combustion engine and a torque converter device, in particular a transmission, which is provided downstream from the internal combustion engine.

The at least one electric drive is preferably a starter generator.

Other features which are considered as characteristic for the invention are set forth in the appended claims.

Although the invention is illustrated and described herein as embodied in a hybrid vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
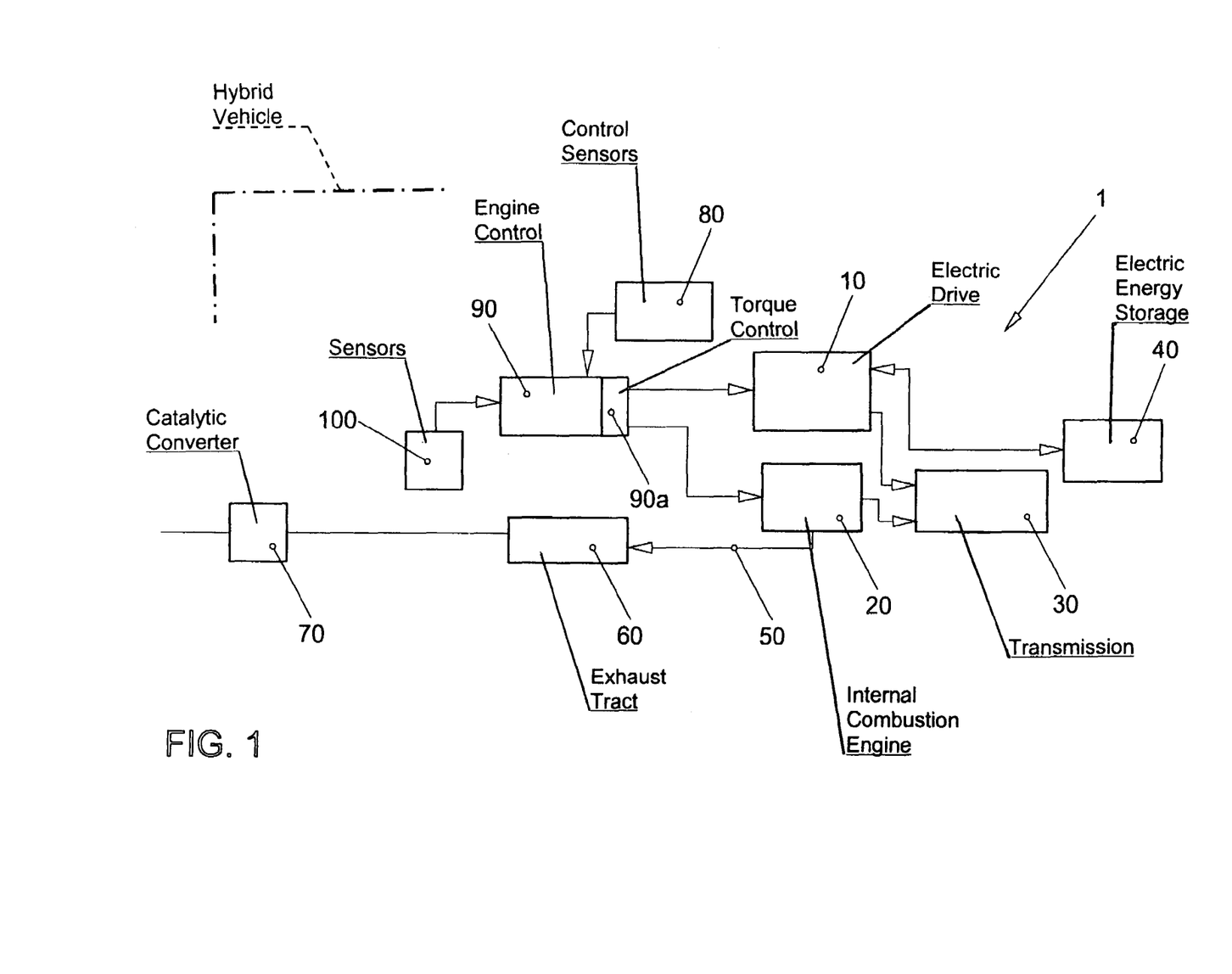
FIG. 1 is a schematic block diagram of a hybrid drive with a control system for a hybrid vehicle according to the invention.

Referring now to the figures of the drawings in detail and first, particularly, to FIG. 1 thereof, there is shown a schematic illustration of a hybrid drive 1 for a hybrid vehicle which is only schematically indicated by a dash-dotted line. An electric drive 10 and an internal combustion engine 20 are coupled to a transmission 30 which is coupled to at least one vehicle wheel. A positioning of the electric drive 10 between a crankshaft output of the internal combustion engine 20 and a transmission input is preferred. The electric drive 10 is electrically coupled to an electrical energy storage device, for example a chargeable battery or the like. The internal combustion engine 20 is assigned an exhaust gas system 50 with a single catalytic converter 70 in the exhaust tract 60. An engine control device 90 receives control signals from control sensors 80, for example the accelerator pedal module or an anti-lock brake system, and values of operating parameters of the hybrid vehicle, in particular of the electric drive 10, of the internal combustion engine 20, of the exhaust gas system 50 and of further vehicle components from sensors 100.

In a preferred embodiment of the invention, the internal combustion engine 20 is a direct injection spark-ignition engine which is capable of lean operation. A direct injection spark-ignition engine which is capable of stratified operation is particularly preferred since as a result considerable savings in terms of fuel consumption compared to a conventional spark-ignition engine can be achieved in lower load/rotational speed ranges. In particular with these embodiments of the invention it is expedient to configure the catalytic converter system in such a way that the catalytic converter 70 is an $NO_x$ storage catalytic converter.

The $NO_x$ storage catalytic converter 70 is preferably configured to store nitrogen oxides ($NO_x$) in the case of a lean operation. Depending on the loading with $NO_x$ and under certain circumstances depending on other boundary conditions and constraints it is necessary to regenerate the $NO_x$ storage catalytic converter with a stoichiometric to rich operation.

The conversion activity of the catalytic converter system or its components ($NO_x$ storage catalytic converter 70) is dependent on activity parameters, in particular the catalytic converter temperature. The conversion rate only exceeds a limit of 50% above a minimum temperature, the so-called light-off temperature. In general, the light-off temperature of a catalytic converter varies for different pollutant components such as hydrocarbons (HC) or $NO_x$.

Further activity parameters of the catalytic converter system are values of the exhaust gas mass flow, the raw emission of exhaust gas components and the loading with $NO_x$ and/or sulfur oxides ($SO_x$). The values of these activity parameters are determined as a function of the operating parameters of the internal combustion engine, possibly using a model of the catalytic converter system with the aid of signals of the sensors 100, and evaluated in the control device 90.

In a preferred embodiment, the control device 90 includes one or more microprocessors, data memories and interfaces as well as a device 90a through the use of which the overall torque is determined as a function of the control signals of the sensors 80, the overall torque being supplied by the electric drive 10 and the internal combustion engine 20 and being made at least partially available to the transmission 30. Alternatively, the torques can also be determined on the basis of the control signals of the sensors 80 and a calculation model. The coupling between the electric drive 10 and the internal combustion engine 20 permits both negative and positive torque transmission between these two components.

The sensors 100 include sensors for measuring or determining operating parameters, preferably of the storage device 40, of the electric drive 10, of the internal combustion engine 20 and of the exhaust gas system 50. In particular lambda probes may be provided in the exhaust gas system 50 upstream of the catalytic converter 70 or downstream of the catalytic converter 70. In addition, $NO_x$, $SO_x$ or hydrocarbon sensors may be arranged at various locations in the exhaust gas system. In order to measure the temperature of the exhaust gas or of the catalytic converter system it is possible to provide temperature sensors at various installation locations.

There is provision for the torque output of the internal combustion engine and of the electric drive to be optimized in order to reach a predefined conversion threshold value and to optimize the conversion activity of the catalytic converter system 70. Such optimization is preferably provided in a time interval T_Kat after a cold start of the vehicle but may, if necessary, also take place in other operating phases of the internal combustion engine 20. After a cold start, the temperature of the catalytic converter system is initially below the light-off temperature. In this case, the conversion activity is below a light-off value of 50% or 80% and must therefore be increased for environmentally acceptable operation of the internal combustion engine 20. In order to reduce pollutants sufficiently, even higher conversion activities may, under certain circumstances be required and may typically be higher than 80%, higher than 90%, or higher than 95%.

Firstly, methods which are already known from the prior art for a cold start will be described below with reference to FIGS. 2 and 3.

Figure 2:
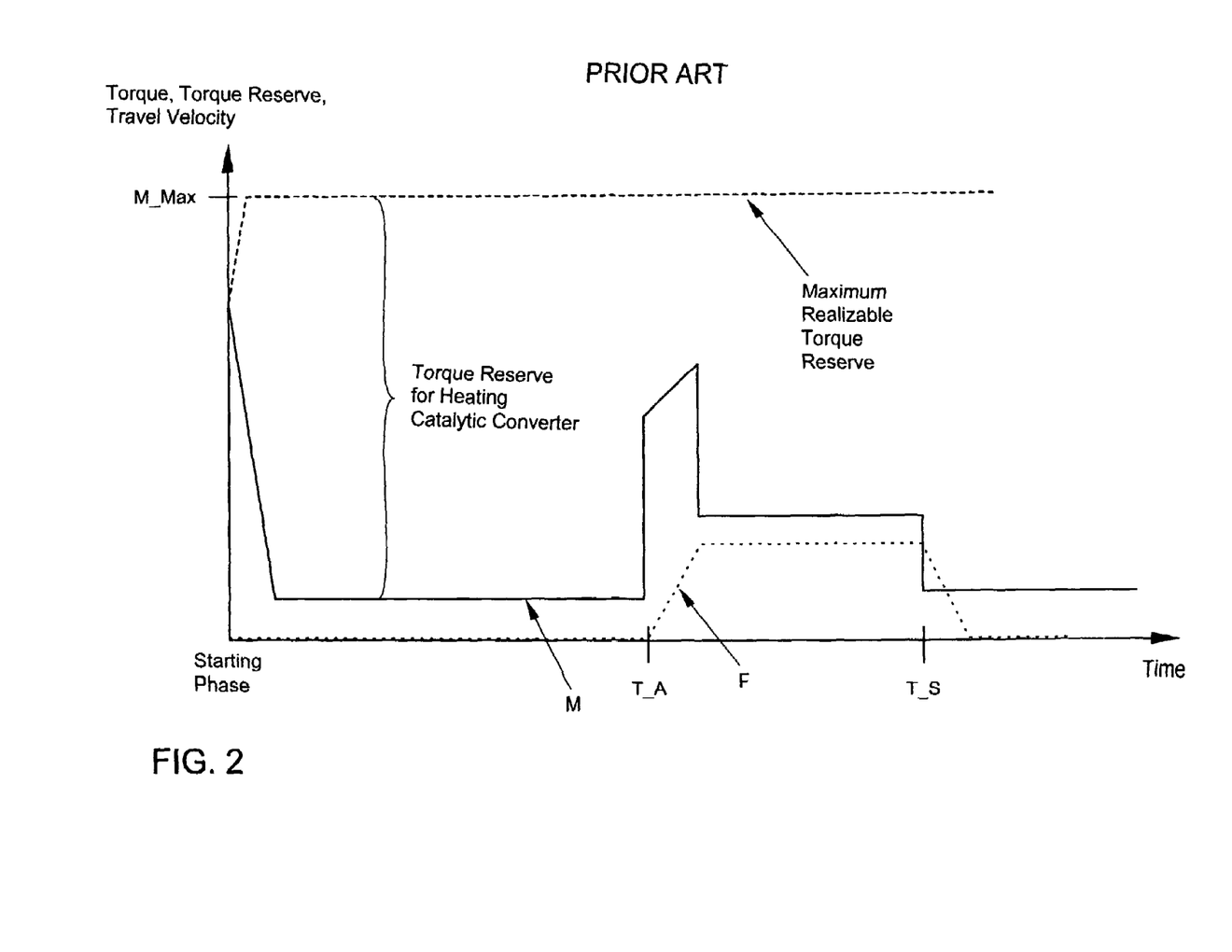
FIG. 2 is a graph illustrating a time profile of engine torques and velocity for a cold start up according to the prior art without electrical assistance.

FIG. 2 illustrates the time profile of an engine torque M of a conventional internal combustion engine for a cold start process. The torque M includes in particular the torques which are necessary for starting the engine, friction, operation of secondary assemblies and propulsion. F designates the traveling velocity as a function of time.

In the starting process shown, the driving off process with an acceleration and a corresponding increase in the torque M starts after an idling phase starting from the time T_A. After a relatively short time after the start, the internal combustion engine has a maximum, realizable torque reserve M_Max which can in fact be utilized for heating the catalytic converter. After a stationary-operation phase the velocity is reduced again to zero at the time T_S, and the engine load drops correspondingly.

In the cold start process illustrated in FIG. 2, the temperature of the catalytic converter system firstly lies below the light-off temperature so that considerable parts of the raw emission of the internal combustion engine are released into the environment. The catalytic converter system is not actually warmed up until the engine or the exhaust gas heats up, unless a separate catalytic converter heater is provided.

Figure 3:
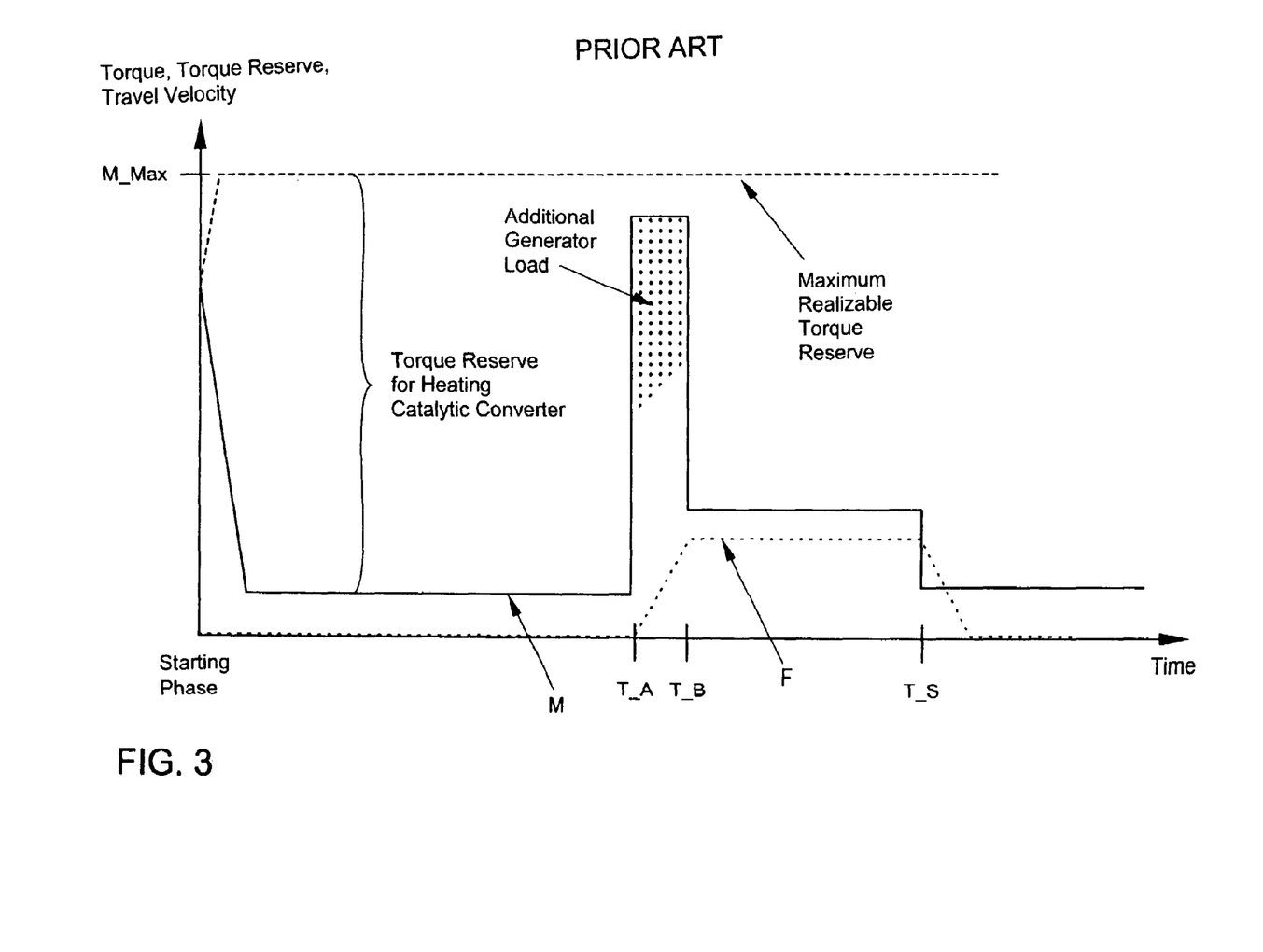
FIG. 3 is a graph illustrating a time profile of engine torques and velocity for a cold start according to the prior art with an additional electrical generator load.

The method of operation for a cold start, which is illustrated in FIG. 3 in more detail and is known from the prior art, has the aim of making the respectively currently present torque reserve useable in order to heat the catalytic converter system. In FIG. 3, a cold start process with additional electrical generator load is illustrated for the same driving curve F as in FIG. 2, wherein it is assumed that the catalytic converter temperature lies below a light-off temperature. In the time interval between the times T_A and T_B, a customary charge of the still cold motor is increased up to the limits of a stable engine operation in order to achieve particularly short catalytic heating times. The load torque of the internal combustion engine is therefore adjusted to the maximum realizable torque reserve. However, the increase in the engine load of the internal combustion engine is usually also accompanied by a significant increase in the raw emissions, in particular of hydrocarbons. The emissions which are reduced by shortening the light-off phase can therefore be overcompensated by increasing the raw emissions, leading to an overall increase in the tail-pipe emissions.

If, as suggested in Published European Patent Application No. EP 1 182 074, the ignition angle is adjusted in the retarded direction, the temperature of the exhaust gas can thus be increased. However, if a further load demand occurs, for example as a result of a driving off process, the air charge of the internal combustion engine is not reduced. Instead, the ignition angle is displaced in the direction of an early ignition to such an extent that the demanded load can be provided by the associated improvement in the efficiency level. This energy component is then not available for heating the catalytic converter system. For this reason, if the load of the internal combustion engine is raised even further by the generator operating mode of the electric drive, the power which is available for heating the catalytic converter can be reduced.

Figure 4:
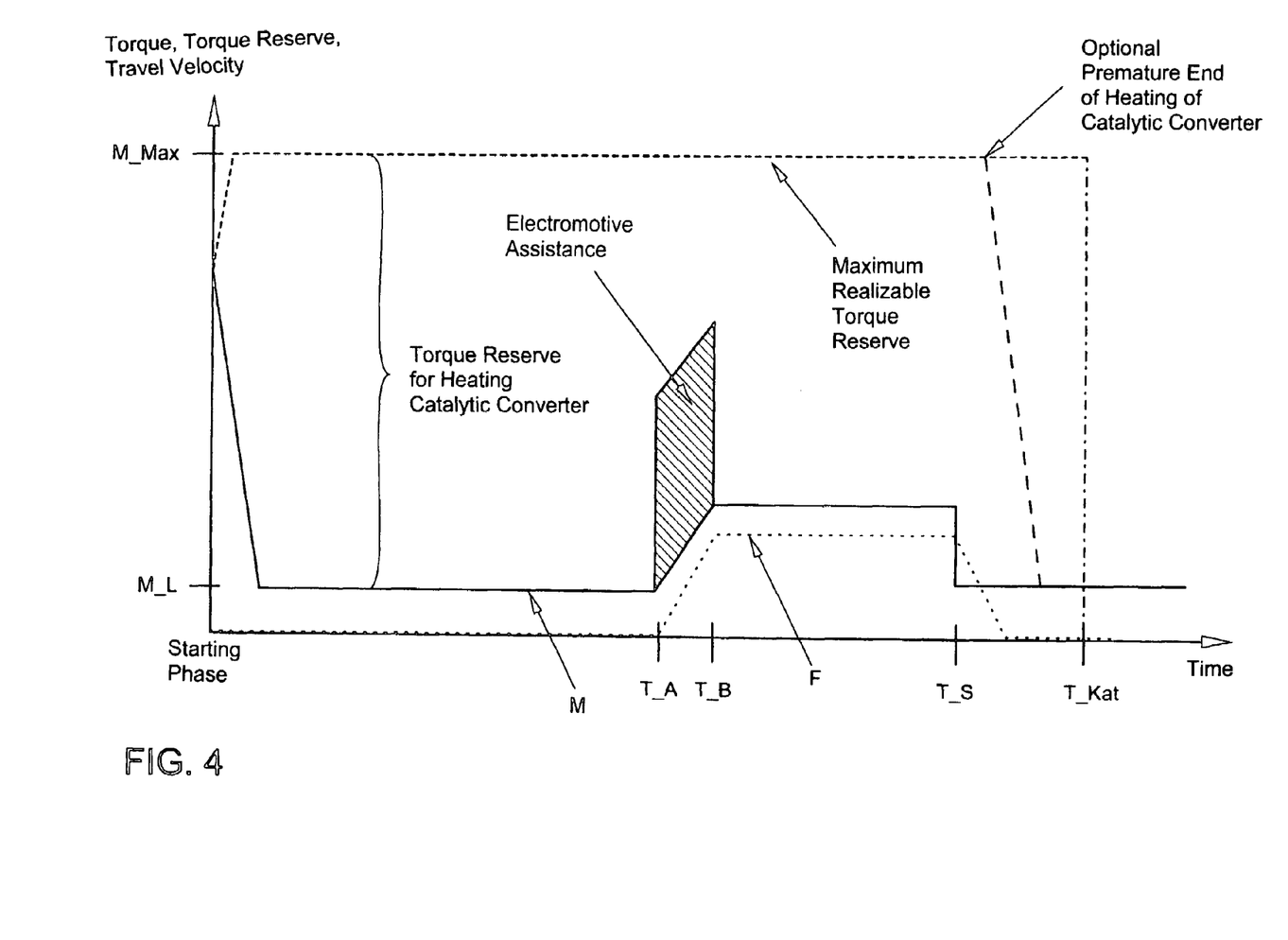
FIG. 4 is a graph illustrating a time profile of engine torques and velocity according to the invention.

FIG. 4 illustrates the time profile of a torque M and a travel velocity F for a cold start operating mode according to the invention. It is assumed here that the catalytic converter system has a temperature below a light-off temperature and for this reason its conversion activity lies below a conversion threshold value. After the internal combustion engine starts, it firstly outputs an idling torque M_L which is made available in particular for carrying out the engine start, overcoming friction, and supplying secondary assemblies. The idling torque M_L is preferably selected in such a way that an acceptable value of raw emissions is not exceeded at the respective point of the operating characteristic diagram.

At the time T_A, a torque demand is issued in order to carry out a driving off process. At the time T_B the driving off process is finished and a constant travel with a constant velocity occurs up to the time T_S. In the time interval T_A to T_B, an electromotive assistance is provided to the internal combustion engine 20 by the use of the electric drive 10. For this reason, in the aforementioned time interval only part of the torque output which is necessary overall for the driving off process is made available by the internal combustion engine 20, while the remaining necessary expenditure in terms of torque is provided by the electric drive 10. A precondition of this is that the electric power made available by the electrical storage device 40 permits this. At the time T_S, the driving curve F shows a reduction in the velocity which leads to a transition to idling at a later time. The torque output of the internal combustion engine 20 is readjusted to the value M_L at this time at the latest.

The torque output of the electric drive 10 and that of the internal combustion engine 20 are preferably optimized within a time interval T_Kat which is necessary to place the catalytic converter system in a state in which the conversion threshold has been reached or exceeded. This state is usually characterized by a catalytic converter temperature which is above the light-off temperature for hydrocarbon.

In a preferred embodiment of the invention, the torque output of the internal combustion engine 20 during the time interval T_Kat is restricted to the value M_L so that any additional torque demand beyond this is met by the electric drive 10. There is preferably also provision for at least 60%, preferably at least 80%, and ideally at least 90%, of a torque demand to be met by the electric drive 10 within T_Kat.

Within the time interval T_Kat, the combustion efficiency level of the internal combustion engine 20 is expediently reduced in a selective fashion in order to increase an exhaust gas temperature. Such a worsening or reduction of the efficiency level is used to increase the exhaust gas temperature. A possible method for reducing the efficiency level is to move the ignition angle in the direction of a retarded ignition. As a result a higher proportion of the fuel energy converted in the combustion chamber is transferred into the exhaust gas. Part of the reduction in the efficiency level of the engine can be compensated by operation with a higher charge by operating the engine with an increased air mass flow. As a result a higher exhaust gas mass flow is generated and this accelerates further the heating of the catalytic converter.

As is known per se, when the ignition angle is moved in the direction of a retarded ignition, due to an increased exhaust gas temperature, lower hydrocarbon concentrations occur upstream of the catalytic converter system. Accordingly, as well as the fact that a larger amount of energy is fed into the exhaust gas system and the catalytic converter system, this therefore results in the advantage of lower raw emissions.

As a result of feeding a greater amount of energy into the exhaust gas system, a more rapid warming of at least part of the catalytic converter system which is in particular close to the engine is made possible. As a result, the heating of the catalytic converter system can be reduced. A reduction in the additional chemical-thermal feeding of energy into the exhaust gas system, which is brought about in order to heat the catalytic converter system, is preferred. In addition or as an alternative, the time interval T_Kat may be reduced by more than 10%, preferably 25%, particularly preferably 40% compared to a conventional heating of the catalytic converter system.

Since in most countries in the world the cleaning effect of the exhaust gas system is dictated by legal regulations for exhaust emission limiting values, the hybrid vehicle according to the invention is preferably configured in such a way that the emission values are equal to or less than the legally prescribed limiting values. In the countries of the European Union, a velocity profile which is intended to correspond to a typical town traffic volume and overland traffic volume is predefined by the New European Driving Cycle (NEDC). The abovementioned configuration is such that given electrical assistance according to the invention the emissions in the NEDC do at least not exceed the level in a conventional operating mode of an identical internal combustion engine or hybrid vehicle.

Figure 5:
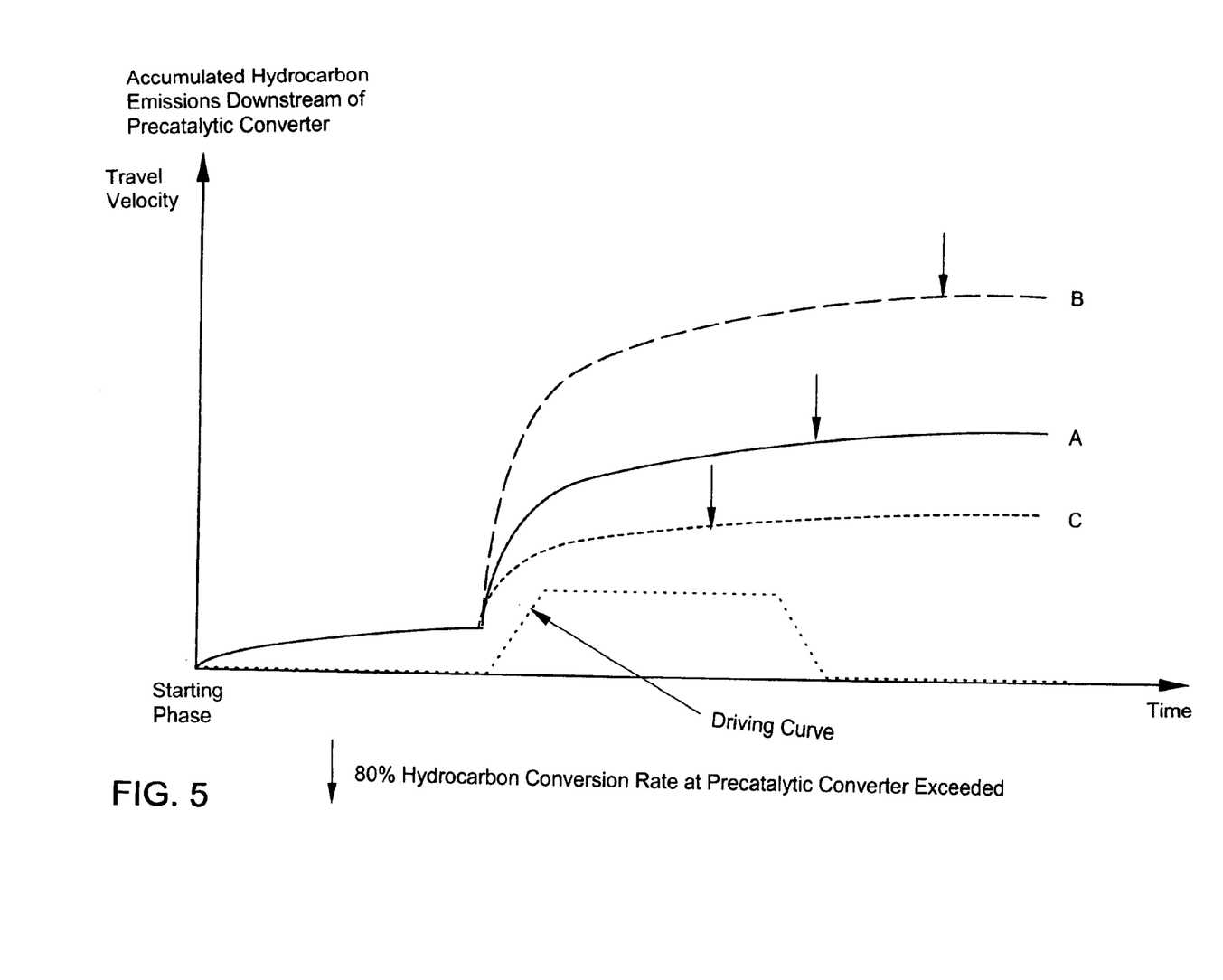
FIG. 5 is a graph illustrating a time profile of the accumulated hydrocarbon emissions downstream of a catalytic converter for various cold start operating modes.

FIG. 5 is a schematic illustration of the time profile of accumulated hydrocarbon emissions downstream of the catalytic converter. In each case a cold start process with the same driving curve designated by F is illustrated. The emission curve designated by A designates a conventional catalytic converter heating method as was illustrated in FIG. 2. Curve B designates a catalytic converter heating method in which a negative torque is applied in the cold starting phase, while curve C designates operation according to the method described last. The short vertical arrow positioned above each of the curves A to C designates the time at which an 80% hydrocarbon conversion rate at the precatalytic converter is exceeded.

As is shown by the illustration in FIG. 5, the method of operation described last above permits low accumulated hydrocarbon emissions as well as allowing an 80% hydrocarbon conversion rate at the catalytic converter to be achieved earlier.

Since the invention makes it easier for a light-off value of the catalytic converter system, or at least of one of its components, to be achieved, the noble metal content of the catalytic converters used in such a hybrid vehicle can be reduced. This applies in particular to vehicles with a direct injection spark-ignition engine and/or a spark-ignition engine which is capable of stratified charge operation. In the prior art, in direct injection spark-ignition engines and/or spark-ignition engines which are capable of stratified charge operation catalytic converters with a noble metal content of more than 3.59 $g/dm^3$ (100 $g/ft^3$) or even more than 4.67 $g/dm^3$ (130 $g/ft^3$) are used as in the NEDC with thermally undamaged catalytic converter systems which achieve hydrocarbon emissions of less than 0.07 g/km and $NO_x$ emissions of less than 0.05 g/km given a proportion of stratified operation in terms of time of at least 250 seconds. In this case, the catalytic converter system is composed of the precatalytic converter which is close to the engine and at least one $NO_x$ storage-catalytic converter which is disposed downstream and has a stored sulfur mass of less than 0.2 g/per liter of catalytic converter volume.

According to the invention, the noble metal content of at least a first catalytic converter is reduced to less than or equal to 3.59 $g/dm^3$ (100 $g/ft^3$), in particular to less than or equal to 2.87 $g/dm^3$ (80 $g/ft^3$). A reduction to less than or equal to 2.16 $g/dm^3$ (60 $g/ft^3$) is preferred. This permits the hydrocarbon emission of not more than 0.1 g/km and a $NO_x$ emission of not more 0.08 g/km to be achieved even after oven aging of the at least one catalytic converter with reduced noble metal content for four hours at 1,100 degrees Celsius in an atmosphere of 2% $O_2$ and 10% $H_2O$ and a $NO_x$ storage catalytic converter with reduced noble metal content for four hours at 850 degrees Celsius in an atmosphere of 2% $O_2$ and 10% $H_2O$ in an otherwise identical vehicle by using the method according to the invention in the NEDC.

As explained above, the use of the hybrid technology provides additional functional possibilities for further reducing the emissions of exhaust gas pollutants of the internal combustion engine. By assisting the catalytic converter heating process by using an electric drive it is also possible to significantly improve the emission behavior of a direct injection spark-ignition engine in that when there are high torque demands after a cold start process some of the overall torque is provided by the electric drive in order to limit the mass flow of exhaust gas or of pollutants from the internal combustion engine when the catalytic converter system is not yet at its operating temperature. Thus, the catalytic converter heating measures cause a catalytic converter which is close to the engine to be heated up, generally to a temperature above its light-off temperature even after a very short time, but an underfloor catalytic converter requires a longer time period until sufficient heating has also taken place here, due to the position remote from the engine and possibly also the thermal inertia of a precatalytic converter which is connected upstream.

For example, it would be possible to implement assistance by an electric drive in the first driving hill in the NEDC according to the method described above, while starting from the beginning of the second driving hill an underfloor catalytic converter would also be at least partially warmed up so that sufficient overall conversion power would subsequently also be possible without electromotive assistance.

Since the emission of pollutants by the internal combustion engine can be very considerably reduced (or limited) in the way described above until an underfloor catalytic converter is heated, this provides a new way for configuring the exhaust gas control system in combination with the hybrid technology. In this context, a precatalytic converter, for example, is completely dispensed with and, if appropriate, the position, size and/or noble metal loading of the main catalytic converter or catalytic converter having a precatalytic stage and a main stage in the underfloor area is adapted. Dispensing with the precatalytic converter considerably simplifies the exhaust gas post-treatment system and reduces the costs. It is thus also conceivable to embody a hybrid vehicle with a direct injection spark-ignition engine.

Positioning the catalytic converter remote from the engine also provides the possibility of reconfiguring the protection of the components. The greater dissipation of heat via the exhaust gas lines upstream of the catalytic converter and the resulting reduction in the temperature of the catalytic converter provides a potential for reducing the enrichment of the mixture at high engine loads and/or at high rotational speeds of the engine, which contributes to decreasing the fuel consumption of the hybrid concept.

According to the invention, in a hybrid vehicle according to FIG. 1, for example, there is therefore provision for the catalytic converter 70 to be disposed so far from the internal combustion engine 20 that the intermediate exhaust tract 60 has a length of at least 500 mm or more.

The possibility of dispensing with a catalytic converter which is close to the engine is provided, for example, by virtue of the fact that the electric drive is used to assist the heating of the catalytic converter or is used as a source of torque in operating situations in which the internal combustion engine could supply such torque only by unacceptably exceeding exhaust gas limiting values due to the absence of a catalytic converter close to the engine. This may be the case, for example, under certain circumstances during the warming up phase of the internal combustion engine after a cold start.

This application claims the priority, under 35 U.S.C. § 119, of German patent application No. 10 2004 035 341.7, filed Jul. 21, 2004; the entire disclosure of the prior application is herewith incorporated by reference.

We claim:

1. A hybrid vehicle, comprising:
a drive system including an electric drive and an internal combustion engine;
said internal combustion engine having a combustion chamber formed therein;
said internal combustion engine including a cylinder head having an exhaust gas outlet formed therein;
said internal combustion engine including a fuel injection device for directly injecting fuel into said combustion chamber and a spark-ignition device for igniting the fuel in said combustion chamber;

said internal combustion engine having a rated rotational speed, a cut-off speed, a rated power, and a given mean pressure present at the rated power;

said internal combustion engine, when operating in a given rotational speed/load range, operating with a stoichiometric setpoint value for a fuel/air mixture in at least a portion of the given rotational speed/load range, the portion of the given rotational speed/load range being a percentage value selected from the group consisting of 30%, 50%, 70%, 80% and 90% of the given rotational speed/load range; and said internal combustion engine operating in the given rotational speed/load range if said internal combustion engine operates in a range between 80% of the rated rotational speed and the lesser of 120% of the rated rotational speed and the cut-off speed of the internal combustion engine, and if said internal combustion engine operates with more than 80% of the given mean pressure present at the rated power;

an exhaust gas control system downstream of said combustion chamber;

said exhaust gas control system including an exhaust tract and a catalytic converter provided in said exhaust tract;

said catalytic converter having an end face facing said cylinder head;

said exhaust tract including an exhaust pipe between said end face of said catalytic converter and said exhaust gas outlet of said cylinder head; and said exhaust pipe having a length of at least 500 mm.

2. The hybrid vehicle according to claim 1, wherein:
said catalytic converter is a precatalytic converter;
said exhaust gas control system includes a further catalytic converter as a main catalytic converter in said exhaust tract; and
said precatalytic converter is disposed closer to said internal combustion engine than said main catalytic converter.

3. The hybrid vehicle according to claim 1, wherein said exhaust tract includes only one catalytic converter.

4. The hybrid vehicle according to claim 1, wherein said exhaust gas control system includes a further exhaust tract, each of said exhaust tract and said further exhaust tract includes only one catalytic converter.

5. The hybrid vehicle according to claim 1, wherein:
said drive system includes a torque control device for controlling a torque output of said internal combustion engine and of said electric drive; and
said torque control device, in order to reach a given conversion threshold value of a catalytic conversion activity, determines a conversion activity value for at least one exhaust gas component in a given time interval and, if the conversion activity value is below the given conversion threshold value, said torque control device increases a torque output of said electric drive and reduces a torque output of said internal combustion engine in comparison with an operation providing no torque from said electric drive.

6. The hybrid vehicle according to claim 1, wherein:
said drive system includes a torque control device for controlling a torque output of said internal combustion engine and of said electric drive; and
said torque control device, in order to reach a given conversion threshold value of a catalytic conversion activity, determines a conversion activity value for at least one exhaust gas component in a given time interval and, if the conversion activity value is below the given conversion threshold value, said torque control device increases a torque output of said electric drive in dependence of a demand and reduces a torque output of said internal combustion engine in comparison with an operation providing no torque from said electric drive.

7. The hybrid vehicle according to claim 1, wherein said exhaust pipe between said end face of said catalytic converter and said exhaust gas outlet of said cylinder head has a length of at least 700 mm and at most a length selected from the group consisting of 900 mm, 1200 mm, 1500 mm, and 2000 mm.

8. The hybrid vehicle according to claim 1, wherein said internal combustion engine is capable of running in a lean operation mode in at least a given portion of a given rotational speed/mean pressure range, the given rotational speed/mean pressure range covers a rotational speed range of 1000 to 3000/min and a mean pressure range of 0 to 300 kPa, and the given portion of the given rotational speed/mean pressure range is a percentage value selected from the group consisting of 60%, 75%, and 90%.

9. The hybrid vehicle according to claim 1, wherein said internal combustion engine is capable of running in a stratified charge operation mode in at least a given portion of a given rotational speed/mean pressure range, the given rotational speed/mean pressure range covers a rotational speed range of 1000 to 3000/min and a mean pressure range of 0 to 300 kPa, and the given portion of the given rotational speed/mean pressure range is a percentage value selected from the group consisting of 60%, 75%, and 90%.

10. The hybrid vehicle according to claim 1, wherein said internal combustion engine is capable of running in a lean operation mode in at least a given portion of a given rotational speed/mean pressure range, the given rotational speed/mean pressure range covers a rotational speed range from idling rotational speed to 1500/min and a mean pressure range of 0 to 200 kPa, and the given portion of the given rotational speed/mean pressure range is a percentage value selected from the group consisting of 20%, 35%, and 50 %.

11. The hybrid vehicle according to claim 1, wherein said internal combustion engine is capable of running in a stratified charge operation mode in at least a given portion of a given rotational speed/mean pressure range, the given rotational speed/mean pressure range covers a rotational speed range from idling rotational speed to 1500/min and a mean pressure range of 0 to 200 kPa, and the given portion of the given rotational speed/mean pressure range is a percentage value selected from the group consisting of 20%, 35%, and 50%.

12. The hybrid vehicle according to claim 1, wherein said internal combustion engine is an aspirating engine.

13. The hybrid vehicle according to claim 1, wherein said internal combustion engine includes a charger selected from the group consisting of an exhaust gas turbocharger, an electrically driven charge air compressor device, and a mechanically driven charge air compressor device.

14. The hybrid vehicle according to claim 1, wherein said catalytic converter is an $NO_x$ storage catalytic converter.

15. The hybrid vehicle according to claim 1, wherein said exhaust gas control system has a given proportion of a total catalytic converter volume per engine capacity, the given proportion is selected from the group consisting of less than 1.3 $dm^3$ per $dm^3$ engine capacity, less than 1.1 $dm^3$ per $dm^3$ engine capacity, less than 0.9 $dm^3$ per $dm^3$ engine capacity, less than 0.7 $dm^3$ per $dm^3$ engine capacity, and less than 0.5 $dm^3$ per $dm^3$ engine capacity.

16. The hybrid vehicle according to claim 1, wherein said exhaust gas control system has a given proportion of a total noble metal load for catalytic conversion per engine capacity, the given proportion is selected from the group consisting of less than 3.3 g per $dm^3$ engine capacity, less than 3.0 g per $dm^3$ engine capacity, less than 2.7 g per $dm^3$ engine capacity, less than 2.4 g per $dm^3$ engine capacity and less than 2.0 g per $dm^3$ engine capacity.

17. The hybrid vehicle according to claim 1, including:
an electric energy storage device connected to said electrical drive, said electric energy storage device having a maximum voltage; and
said electric drive having a maximum mechanical power output when operating with the maximum voltage in a motor operating mode, the maximum mechanical power output being higher than a value selected from the group consisting of 2 kW, 3 kW, 4 kW, 6 kW, and 9 kW per 1000 kg of unladen vehicle weight.

18. The hybrid vehicle according to claim 1, including:
an electric energy storage device connected to said electrical drive; and
said electric drive having a maximum charge power output when operating in a generator operating mode with a maximum charge voltage, the maximum charge power output being higher than a value selected from the group consisting of 2 kW, 3 kW, 4 kW, 6 kW, and 9 kW per 1000 kg of unladen vehicle weight.

19. The hybrid vehicle according to claim 1, including:
a torque converter downstream of said internal combustion engine; and
said electric drive being a crankshaft starter generator provided between said internal combustion engine and said torque converter.

20. The hybrid vehicle according to claim 19, wherein said torque converter is a transmission.

21. The hybrid vehicle according to claim 1, wherein said electric drive is a starter generator.

* * * * *